United States Patent Office 3,103,496
Patented Sept. 10, 1963

3,103,496
SOLUTIONS OR SWELLINGS OF LINEAR POLY-
AMIDES AND PROCESS FOR PREPARING
SAME
Gerhard Lohaus, Bad Soden, Taunus, Germany, assignor
to Farbwerke Hoechst Aktiengesellschaft vormals
Meister Lucius & Brüning, Frankfurt am Main, Germany, a corporation of Germany
No Drawing. Filed Apr. 19, 1960, Ser. No. 23,132
Claims priority, application Germany Apr. 23, 1959
3 Claims. (Cl. 260—30.6)

The present invention relates to solutions or swellings of linear polyamides and to a process for preparing same by dissolving or swelling these polyamides in phosphoric acid-tris-dimethylamide.

In U.S. patent application Serial No. 819,007, filed June 9, 1959, is described a process for preparing high molecular weight linear polyamides from β-aminocarboxylic acids carrying alkyl groups as substituents in the β-position. The products so obtained possess valuable properties but they are sometimes difficult to work up since a great number of these β-polyamides only melt at a high temperature with decomposition or are generally insoluble or even unswellable in the customary solvents. It is therefore of great importance to find solvents for these β-polyamides in order to convert the polymer into fibers, films, coatings or the like.

It is known that some β-polyamides of the structure given above dissolve rather readily in some organic acids, such as formic acid, dichloroacetic acid and also in hot acetic acid, but the solutions obtained are unstable. Their viscosity is considerably reduced even when allowed to stand for a short time at room temperature. In other words, these aggressive acids cannot practically be used as solvents in an industrial process. Solutions of β-polyamides in phenols, 1,1,1-trifluoroethanol and 1,1,1-trichloroethanol exhibit a stable viscosity, but these solvents involve a series of disadvantages, especially toxicity.

I have now found that phosphoric acid-tris-dimethylamide

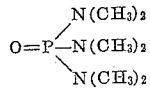

possesses a high dissolving or swelling power for linear polyamides prepared from at least one β-aminocarboxylic acid containing 2 alkyl groups in the β-position of which at least one is a methyl group, whilst the other alkyl group may be an aliphatic, branched or unbranched hydrocarbon group carrying from 2 to 4 carbon atoms. As aminocarboxylic acids of this type there may be mentioned more especially: β-methyl-β-amino-butyric acid, β-methyl-β-aminovaleric acid, β-methyl-β-aminocaproic acid, α,β-dimethyl-β-aminobutyric acid, α-ethyl-β-methyl-β-aminovaleric acid. Phosphoric acid-tris-dimethylamide is also a suitable solvent for copolyamides which contain the aforesaid β-aminocarboxylic acids in a proportion of at least 80% by weight and the remainder being at least one other polyamide forming aminocarboxylic acid. As co-components there may be used more especially α,γ, and ε-aminocarboxylic acids, for example γ-amino-butyric acid and ε-aminocaproic acid.

Phosphoric acid-tris-dimethylamide can be prepared in various ways. It is especially advantageous to prepare phosphoric acid-tris-dimethylamide from phosphorus oxychloride and dimethylamine in carbon tetrachloride in the manner described by D. F. Heath and P. Casapieri in Trans. Farad. Soc. 47, 1093 (1951). Phosphoric acid-tris-dimethylamide is a colorless and mobile liquid of very good chemical and thermal stability. It can be distilled under atmospheric pressure without significant decomposition at its boiling point of 231° C. (boiling point: 120° C. under a pressure of 10 millimeters of mercury) and is miscible with water in any desired ratio. Phosphoric acid-tris-dimethylamide can be readily recovered from its aqueous solution by extraction, for example with methylene chloride, or by distillation under reduced pressure.

The effect according to this invention can also be obtained although it may be less pronounced by using phosphoric acid-tris-dimethylamide in admixture with another substance (solvent auxiliary) as specified below for the dissolution of the polyamides described above. In such mixture, phosphoric acid-tris-dimethylamide should be present in a proportion of at least 40% by volume, calculated on the total volume of the solvent mixture used. These solvent auxiliaries alone exhibit a certain swelling power for polyamides or copolyamides of the type described above at a raised temperature of between about 30° C. and 150° C.

As auxiliary solvents there may be used for example: derivatives of phosphoric acid other than the dimethylamide mentioned above, such as amides with branched or unbranched higher alkyl groups containing from 1 to 6 carbon atoms, especially ethyl groups, ester amides, for example phosphoric acid monoalkylester-bis-dialkylamide, especially phosphoric acid-monomethylester-bis-dimethylamide

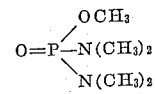

phosphoric acid dialkylester-dialkylamides the alkyl groups of which may consist of the hydrocarbon radicals specified above, pyrophosphoric acid dialkylamides

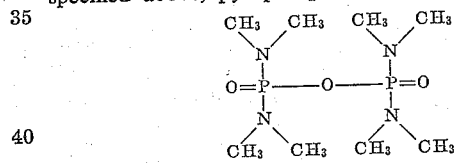

such as octamethyl-pyrophosphoric acid-tetramide, tetramethyl-tetraethyl-pyrophosphoric acid tetramide, and polymeric phosphoric acid amides and ester amides, which are obtained by reacting simultaneously phosphorus oxychloride with secondary monoamines and di-secondary diamines or oxydialkylamines; there may also be used lower carboxylic acid alkylamides, such as dimethyl formamide, dimethylacetamide etc.; lactams, such as N-methyl-α-pyrrolidone, N-propyl-α-pyrrolidone; lower sulfoxides, such as dimethyl sulfoxide, methyl-ethyl-sulfoxide and, furthermore, trichloroethanol and phenols, such as phenol, ortho-chloro-phenol, meta-cresol, 2,6-diethyl phenol. The full effect of this invention, it is admitted, cannot be obtained by the combined use of an auxiliary solvent with phosphoric acid-tris-dimethylamide, but still good swelling effects are obtained even in the extreme case. In some instances, it is, however, advantageous from an economical point of view to use such combination as some of the above auxiliary solvents are more readily available and less expensive than phosphoric acid-tris-dimethylamide. In this case, it is also advantageous that the aforesaid polymeric phosphoric acid amides and pyrophosphoric acid dialkylamides are not volatile and may, therefore, remain in the end products as softeners after evaporation of phosphoric acid-tris-dimethylamide. It is understood that these amides may also be removed from the end product by subsequent washing. The above statements also apply to mixtures comprising phosphoric acid-tris-dimethylamide and scarcely volatile or not volatile phenols.

A solution of 20% strength or more in phosphoric acid-tris-dimethylamide of, for example, a homopolymer from α,β-dimethyl-β-butyrolactam or β-methyl-β-caprolactam, remains homogeneous at room temperature, whereas a 10% solution of uniform poly-β-methyl-β-butyrolactam remains homogeneous only at a temperature above 40° C.–50° C. Substantially more pronounced is the dissolving power of phosphoric acid-tris-dimethylamide for copolyamides which besides β-methyl-β-butyrolactam need contain only a relatively small proportion, for example 0.1% by weight and advantageously between about 5 and 15% by weight, of a second β-lactam as co-component, for example β-methyl-β-caprolactam. For example, a 20% solution of the high molecular weight polyamide prepared from 90 parts by weight β-methyl-β-butyrolactam and 10 parts by weight β-methyl-β-caprolactam, remains clear even at room temperature.

The polyamides defined above are dissolved in phosphoric acid-tris-dimethylamide alone or in a mixture thereof with an auxiliary solvent at a raised temperature, for example between about 60° C. and 110° C. Good results can, however, also be obtained by dissolving the polyamides at room temperature. The temperature at which the solutions are prepared is not critical and a higher temperature is only used to promote dissolution which is still further promoted by stirring the mixtures during the dissolving process. Solutions, especially of copolymers, or swellings can also be obtained in advantageous manner by directly polymerizing at least one lactam of a β-aminocarboxylic acid of the above described type in phosphoric acid-tris-dimethylamide in the presence of a strong basic catalyst as described in the above patent application.

The following examples serve to illustrate the invention, but they are not intended to limit it thereto, the parts being by weight unless other wise stated and the relationship of parts by weight to parts by volume being the same as that of the kilogram to the liter:

Example 1

1 part poly-β-methyl-β-butyrolactam (relative viscosity: 7.5; determined as a 1% solution in sulfuric acid as 20° C.) was heated to 80° C., advantageously while stirring, with 9 parts by volume phosphoric acid-tris-dimethylamide until completely dissolved. The resulting highly viscous solution was cooled to 50° C. and then remained homogeneous for several hours.

Example 2

1 part of a copolymer prepared from 95 parts β-methyl-β-butyrolactam and 5 parts β-methyl-β-caprolactam (relative viscosity: 8.8) was dissolved under the conditions specified in Example 1 in 9 parts by volume phosphoric acid-tris-dimethylamide. The solution of the polyamide remained clear even after it had been cooled to room temperature.

Example 3

3 parts poly-β-methyl-β-caprolactam (relative viscosity: 2.1) and 7 parts by volume phosphoric acid-tris-dimethylamide yielded under the conditions specified in Example 1 a solution which remained homogeneous and very viscous even at room temperature.

Example 4

A solution prepared under the conditions specified in Example 1 from 1 part poly-α,β-dimethyl-β-butyrolactam (relative viscosity: 1.7) in 4 parts by volume phosphoric acid-tris-dimethylamide remained homogeneous at room temperature.

Example 5

1 part β-methyl-β-caprolactam, 9 parts β-methyl-β-butyrolactam and 50 parts phosphoric acid-tris-dimethylamide were mixed. At 100° C. and under a pressure of 15 mm. mercury air which had been dried over phosphorus pentoxide was passed for 1 hour through the mixture obtained. The mixture was cooled to room temperature and 0.05 part pyrrolidone sodium were dissolved in the batch. A clear, very viscous solution of the copolymer was obtained within a few hours. After neutralization of the catalyst, the solution so obtained could be directly used for making shaped articles.

Example 6

1.5 parts of a copolymer (relative viscosity: 9.2) prepared from 90 parts β-methyl-β-butyrolactam and 10 parts β-methyl-β-caprolactam, were dissolved in a mixture of 5 parts by volume phosphoric acid-tris-dimethylamide and 3.5 parts by volume phosphoric acid monomethylester-bis-dimethylamide to yield a solution which was homogeneous at room temperature.

Example 7

1 part poly α,β-dimethyl-β-butyrolactam (relative viscosity: 1.7) was dissolved in a mixture of 4 parts by volume phosphoric acid-tris-dimethylamide and 5 parts by volume dimethylsulfoxide. The solution obtained was clear at room temperature.

Example 8

1 part poly-β-methyl-butyrolactam swelled strongly at room temperature in a mixture prepared from 4.5 parts by volume phosphoric acid-tris-dimethylamide and 4.5 parts by volume N-methylpyrrolidone.

I claim:

1. A solution comprising phosphoric acid-tris-dimethylamide as a solvent and, dissolved therein, a linear polyamide consisting essentially of at least 80 percent by weight of at least one β-aminocarboxylic acid substituted in the β-position by two alkyl groups one of which is methyl and the other of which is a member selected from the group consisting of alkyl groups having 1 to 4 carbon atoms, the balance of said polyamide being a member selected from the group consisting of α, γ, and ε-aminocarboxylic acids.

2. A solution as in claim 1 wherein said solution comprises at least 40 percent by volume, based on the total solvent volume, of phosphoric acid-tris-dimethylamide, the balance of solvent being at least one member selected from the group consisting of phosphoric acid monoalkylester-bis-dialkylamide, dimethyl formamide, dimethylacetamide, N-methyl-α-pyrrolidone, N-propyl-α-pyrrolidone, dimethyl sulfoxide, methyl-ethyl-sulfoxide, trichloroethanol, phenol, ortho-chloro-phenol, meta-cresol, and 2,6-diethyl phenol.

3. A process for preparing a solution of a linear polyamide, which process comprises polymerizing a mixture consisting of at least 80 percent by weight of at least one β-aminocarboxylic acid substituted in the β-position by two alkyl groups one of which is methyl and the other of which is a member selected from the group consisting of alkyl groups having 1 to 4 carbon atoms, the balance of said mixture being a member selected from the group consisting of α, γ, and ε-aminocarboxylic acids, in contact with a strong basic catalyst and phosphoric acid-tris-dimethylamide.

References Cited in the file of this patent

UNITED STATES PATENTS

| | | |
|---|---|---|
| 2,487,859 | Dickey et al. | Nov. 15, 1949 |
| 2,606,168 | Ham | Aug. 5, 1952 |
| 2,769,792 | Ham | Nov. 6, 1956 |
| 2,809,958 | Barnes et al. | Oct. 15, 1957 |
| 2,831,825 | Campbell | Apr. 22, 1958 |
| 2,952,652 | Beindorff et al. | Sept. 13, 1960 |

OTHER REFERENCES

Schildknecht: "Vinyl and Related Polymers," John Wiley & Sons, Inc., New York (1952), pages 270–271.